United States Patent
Milby

(10) Patent No.: US 7,949,655 B2
(45) Date of Patent: *May 24, 2011

(54) JOINS OF RELATIONS IN AN OBJECT RELATIONAL DATABASE SYSTEM

(75) Inventor: Gregory H. Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/546,849

(22) Filed: Aug. 25, 2009

(65) Prior Publication Data
US 2009/0313213 A1    Dec. 17, 2009

Related U.S. Application Data

(63) Continuation of application No. 10/056,880, filed on Oct. 26, 2001, now Pat. No. 7,620,615.

(51) Int. Cl.
*G06F 17/30* (2006.01)

(52) U.S. Cl. ........................ 707/719; 707/714

(58) Field of Classification Search ............... 707/714, 707/716, 718, 719, 999.002, 999.104, 999.107
See application file for complete search history.

(56) References Cited

U.S. PATENT DOCUMENTS

| | | | | |
|---|---|---|---|---|
| 5,608,904 | A * | 3/1997 | Chaudhuri et al. | 1/1 |
| 6,012,054 | A * | 1/2000 | Seputis | 702/180 |
| 6,275,818 | B1 * | 8/2001 | Subramanian et al. | 1/1 |
| 6,338,056 | B1 * | 1/2002 | Dessloch et al. | 707/711 |
| 6,341,281 | B1 * | 1/2002 | MacNicol et al. | 1/1 |
| 6,351,742 | B1 * | 2/2002 | Agarwal et al. | 1/1 |
| 6,516,310 | B2 * | 2/2003 | Paulley | 1/1 |
| 6,567,802 | B1 * | 5/2003 | Popa et al. | 1/1 |
| 6,763,359 | B2 * | 7/2004 | Lohman et al. | 707/718 |
| 6,947,934 | B1 * | 9/2005 | Chen et al. | 1/1 |
| 2002/0198891 | A1 * | 12/2002 | Li et al. | 707/102 |
| 2006/0230016 | A1 * | 10/2006 | Cunningham et al. | 707/2 |

* cited by examiner

*Primary Examiner* — Leslie Wong
(74) *Attorney, Agent, or Firm* — Trop, Pruner & Hu P.C.

(57) ABSTRACT

A database system includes object relational tables having at least one complex attribute. The database system also includes an optimizer module that selects a join plan for a given query that specifies a join of multiple tables. If the query includes a function selected from the group consisting of a selection predicate applied on a complex attribute, a projection applied on a complex attribute, and a user-defined data type method, then a join path for the join query is determined based in part on a cost associated with application of the function. Application of the function is performed on one of a base table and a join table depending on which has a lower cardinality. The join table is a result of a join of the base table and another table.

15 Claims, 11 Drawing Sheets

Select T1.A, T2.B From T1, T2, T3
  Where T1.C=99 AND T2.D='george' AND T3.E=66
  AND T1.F =T2.F AND T2.G=T3.G Select T1.A, T2.B From T1, T2, T3
  Where T1.C=99 AND T2.D='george' AND T3.E=66
  AND T1.F =T2.F AND T2.G=T3.G Select T1.A, T2.B, T3.Video Colorize() From T1, T2, T3, T4
Where T1.face = IMAGE(\\url\myface.jpg) AND T2.D='george'
AND T4.Audio = AUDIO (\\url\georgeharrison.wav)
AND T1.F=T2.F AND T2.G=T3.G AND T1.H=T4.H
AND T2.K=T4.K $\Pi_{T1.A,T2.B,T3.Video.Colorize()}$ $\sigma$ T1.face=IMAGE(\\url\myface.jpg);T2D='george';
T4.Audio=AUDIO (\\url\georgeharrison.wav);
T1.F=T2.F;T2.G=T3.G;T1.H=T4.H;T2.K=T4.K

JOINS OF RELATIONS IN AN OBJECT RELATIONAL DATABASE SYSTEM

CROSS REFERENCE TO RELATED APPLICATION

This is a continuation of U.S. Ser. No. 10/056,880 now U.S. Pat. No. 7,620,615, filed Oct. 26, 2001, which is incorporated herein by reference.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, thing, or other object about which the table contains information.

A traditional RDBMS provides relatively simple data types, such as integers, real numbers, character strings, and so forth. Object relational database management systems (ORDBMS) provide more complex data types, such as data types used to represent image data, audio data, video data, multimedia data, and so forth.

To extract data from, or to update, a relational table in an RDBMS or ORDBMS, queries according to a standard database-query language (e.g., Structured Query Language or SQL) are used. Examples of SQL statements include INSERT, SELECT, UPDATE, and DELETE. The SELECT statement is used to retrieve information from the database and to organize information for presentation to a user or an application program. The SELECT statement can specify a join operation to join rows of multiple tables. An example SELECT statement is provided below.

```
SELECT  T1.A, T2.B
FROM    T1, T2, T3
WHERE   T1.C = 99 AND T2.D = "GEORGE" AND T3.E = 66 AND
        T1.F = T2.F AND T2.G = T3.G
```

The example query above performs a join of tables T1, T2, and T3. Attribute A (or column A) of table T1 and attribute B (or column B) of table T2, represented as T1.A and T2.B, respectively, are part of the select list. Each item of the select list is also referred to as a projection. The example query also has a Where clause that specifies selection predicates, which are search conditions or criteria that specify the rows to be retrieved from the joined tables.

In response to a join query, an optimizer in the database system selects a plan (from among multiple possible plans) that performs the join of multiple tables. The optimizer selects a lowest (or a lower cost) join plan for a given query from the multiple possible plans.

Typically, for optimal performance, selection predicates (in the Where clause of a join query) and projections (the items of the select list) are placed as far down a query tree as possible. This means that the selection predicates and projection expressions that apply to a single relation are executed at the earliest possible opportunity. Usually, this translates into executing the functions (selection predicate or projection) at the time the relation to which they apply is being accessed. A major assumption underlying this is that functions (such as multiply, add, equal to, less than, greater than) executed on items of a simple relational database data type (e.g., an integer, real number, etc.) occurs in near zero time (when compared to the time needed to perform input/output operations such as disk access operations or data transfer over communications channels). Typically, selection predicate functions reduce the number of rows of a relation, which results in lessening the number of the storage access and bus communication operations that are needed during a subsequent join operation. As a result, early application of projections and selection predicates tends to improve performance in a standard relational database management system.

However, the assumption that functions applied on items of a database system incur near zero cost may no longer be applicable when applied to an ORDBMS. An ORDBMS is able to store relatively complex data types, such as data types defined to store audio files, video files, and so forth. Functions applied on such complex data types can take a relatively long time to execute. In addition, an object stored in an object relational table is associated with methods. Some of these methods can be relatively complex, with relatively long execution times. Thus, the application of selection predicates and projections on objects of an object relation can take a significant amount of time. Under this scenario, early application of functions may no longer result in the most optimal join plan.

SUMMARY

In general, an improved method and apparatus is provided for performing joins in an object relational database management system having object relational tables with complex attributes. For example, a method of performing a join in a database system comprises receiving a join query containing at least one function selected from the group consisting of a selection predicate applied on a complex attribute, a projection applied on a complex attribute, and a user-defined data type method. A cost associated with applying the function on a first table and a cost associated with applying the function on a second table are determined. A join path is selected based on relative costs of applying the function on the first and second tables. A table includes a relation, a relational table, or object relational table.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
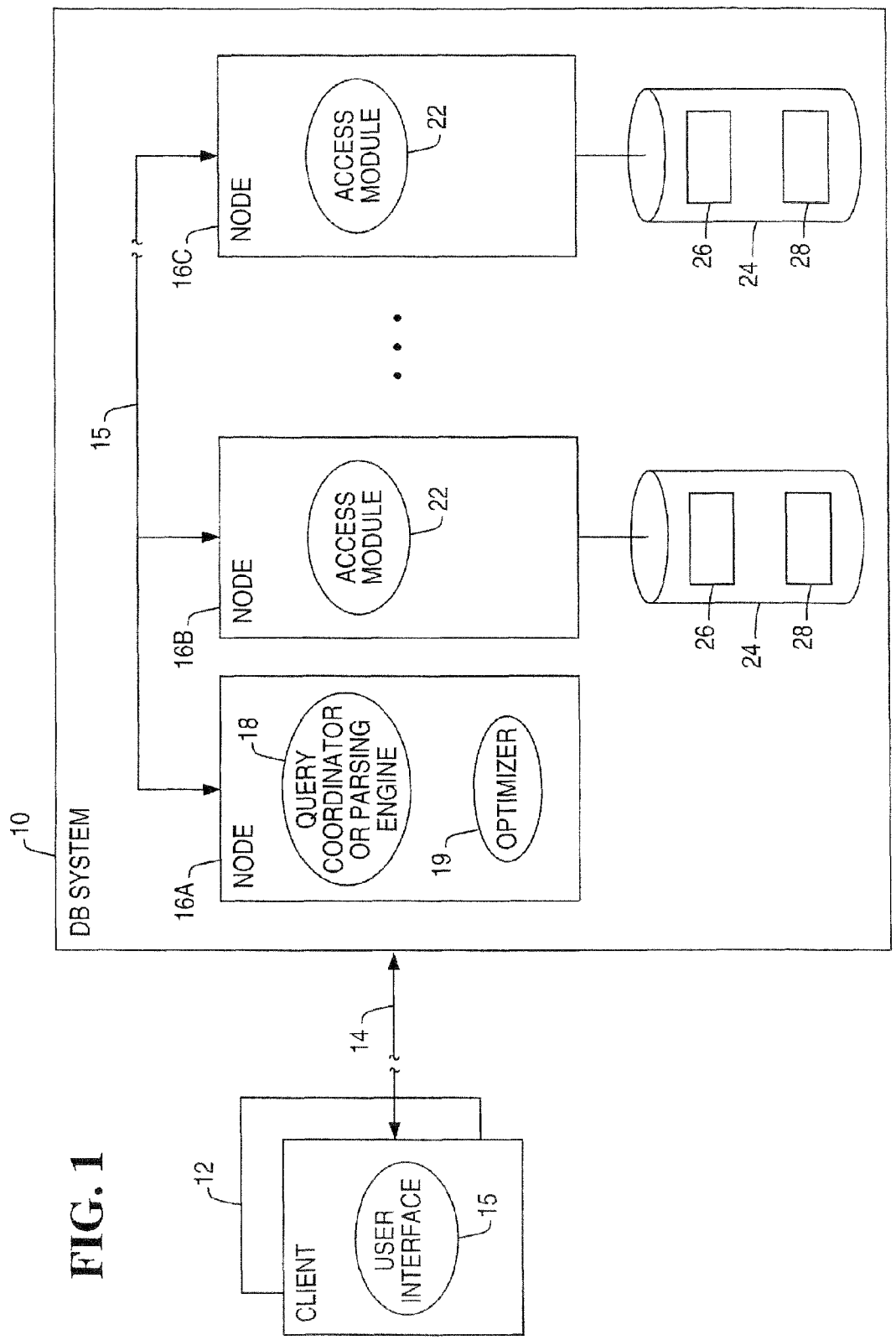
FIG. 1 is a block diagram of an example embodiment of a database system.

FIG. 1 shows a database system 10 that is accessible by one or more client terminals 12 over a network 14. Examples of the network 14 include a local area network (LAN), a wide area network (WAN), or some other type of communications channel. A user interface 15 is provided in each client terminal 12 through which a user is able to issue database queries to extract or manipulate data stored in the database system 10. Such queries are according to a standard database query language, such as the Structured Query Language (SQL) from the American National Standards Institute (ANSI). One version of SQL is the SQL-92 Standard, while another version is the SQL-99 Standard (also referred to as the SQL-3 Standard).

SQL-99 provides for user defined-data types (UDTs), which can be relatively complex data types. A complex data type can be used to define an object such as audio data, video data, image data, multimedia data, and so forth. UDTs can be defined in an object relational database management system (ORDBMS). Thus, in one embodiment, the database system 10 is an ORDBMS. However, in other embodiments, other types of database systems that provide for complex data types can also be employed.

A UDT is associated with one or more methods, which are routines that are invoked to perform a task with respect to data defined by the UDT. To define such methods, a CREATE METHOD statement is provided by SQL-99.

According to one arrangement, the database system 10 includes a plurality of nodes 16A, 16B, and 16C. In other embodiments, a smaller or larger number of nodes can be employed. In yet another arrangement, the database system 10 can be implemented as a single-node system, with the single node including a single processor or multiple processors.

The nodes 16A, 16B, and 16C are coupled together by an interconnect layer 15. The node 16A is able to communicate with the network 14, and includes a parsing engine (PE) or query coordinator 18. The parsing engine 18 interprets a query (such as a query received from the client terminal 12), checks the query for proper SQL syntax, and sends out executable steps to be performed by the nodes 16B, 16C. Alternatively, the parsing engine 18, or multiple instances of the parsing engine 18, are executed at the nodes 16B, 16C.

As further shown in FIG. 1, the node 16A also includes an optimizer module 19. For a given query, the optimizer module 19 selects a lowest cost (or lower cost) execution or access plan from among a plurality of possible plans. In one example, cost is defined as the amount of time and system resources needed to perform an execution plan. In an alternate embodiment, the optimizer module 19, or multiple instances of the optimizer module, are executed on other nodes.

Each of the nodes 16B, 16C includes an access module 22. One example of the access module 22 is the access module processor (AMP) used in some TERADATA® database systems from NCR Corporation. The access module 22 is responsible for managing access to respective portions of the database system 10. As shown in FIG. 1, each access module 22 manages access to data stored in a respective storage module 24. Although shown as discrete components, the storage modules 24 may be part of the same storage subsystem, with the storage modules 24 representing different partitions of the storage subsystem.

Each storage module 24 stores respective portions of one or more tables (also referred to as relations) 26, 28. If the database system 10 is an ORDBMS, then each table 26, 28 is an object relational table that has one or more complex attributes according to complex data types. As used here, the term "complex attribute" refers to an attribute of a relation (or table) that stores data of relatively complex data types. Examples of complex data types include data types defined for storing image data, audio data, video data, multimedia data, and any other data that may require a large amount of storage (as compared to relatively simple data types such as integers, real numbers, characters, strings, and so forth). A selection predicate or projection applied on a complex attribute is referred to as a "costly" selection predicate or projection, respectively. A costly selection predicate or projection is also referred to as a "costly function." In addition, a "costly function" also includes a method or routine associated with a UDT. A function is considered costly if the execution time of the function is significant when compared to an I/O operation (e.g., storage access or communications channel transfer).

Figure 2:
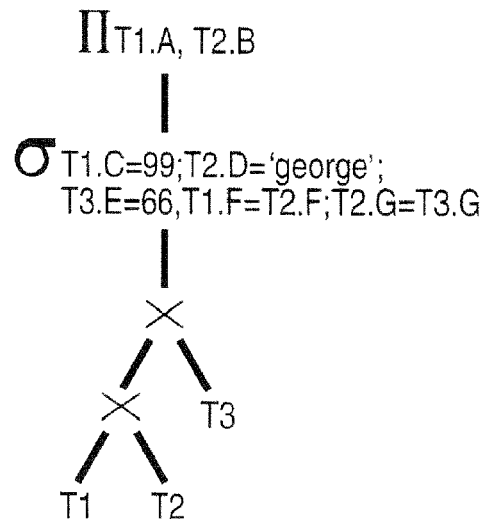
FIGS. 2 and 3 illustrate query trees representing an example query.

As shown in FIG. 2, an example query (and its associated query tree structure) is illustrated. The example query is as follows:

| SELECT | SELECT T1.A, T2.B |
|---|---|
| FROM | T1, T2, T3 |
| WHERE | T1.C = 99 AND T2.D = "GEORGE" AND T3.E = 66 AND T1.F = T2.F AND T2.G = T3.G |

The query is a join query that performs a join of three tables, T1, T2, and T3. The query specifies a select list (also referred to as a "projection list") of T1.A and T1.B. It is assumed that attributes T1.A and T1.B are non-complex attributes. The query also includes a Where clause specifying selection predicates. The selection predicates are applied on attributes T1.C, T1.D, T3.E, T1.F, T2.F, T2.G, and T3.G. Again, the selection predicates are assumed to apply on non-complex attributes of tables T1, T2, and T3.

Figure 3:
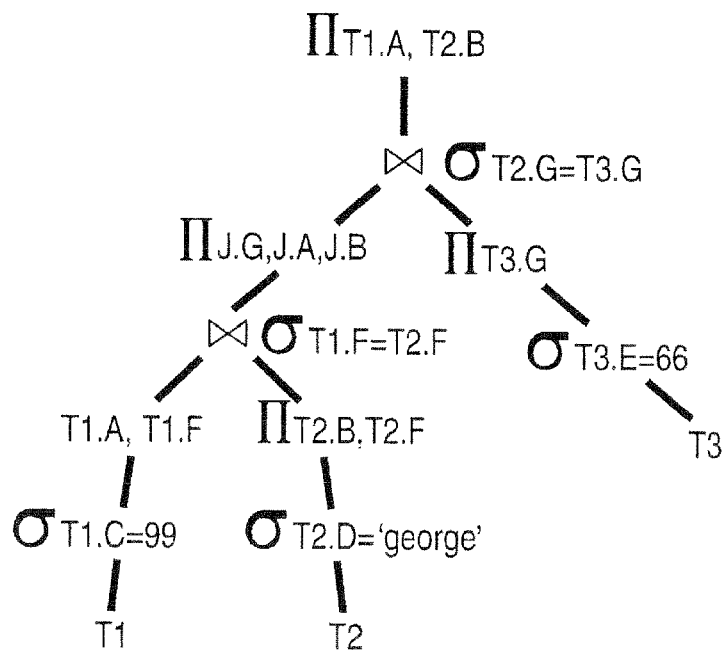

In FIG. 2, the symbol $\sigma$ represents a selection predicate, while the symbol $\pi$ represents a projection (which includes an attribute from the select list). Since the selection predicates and projections are applied on non-complex attributes, the selection predicates and projections are pushed as far down the query tree as possible, as shown in FIG. 3. Thus, as shown in FIG. 3, the predicate T1.C=99 and T2.D="GEORGE" are applied on tables T1 and T2, respectively, before a join is performed of the two tables. In addition, projections T1.A, T1.F and T2.B, T2.F are also performed on the tables T1 and T2, respectively, before the join operation. Thus, in the example of FIG. 3, the optimizer module 19 performs the selection predicates and projections as early as possible in a join path.

Figure 4:
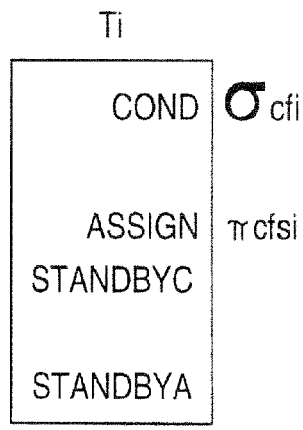
FIG. 4 illustrates a representation of a table.

In the ensuing discussion, a table Ti is represented as in FIG. 4. The table Ti is associated with the following lists: a condition (cond) list containing one or more selection predicates $\sigma$cfi; an assign or projection list containing one or more projections $\pi$cfsi; a StandbyC list, which is a standby list of one or more predicates associated with table Ti; and a StandbyA list, which is a standby list of one or more projections. As discussed further below, the StandbyC and StandbyA lists are used to identify costly functions (complex selection predicates or projections, or methods associated with UDTs).

Figure 5:
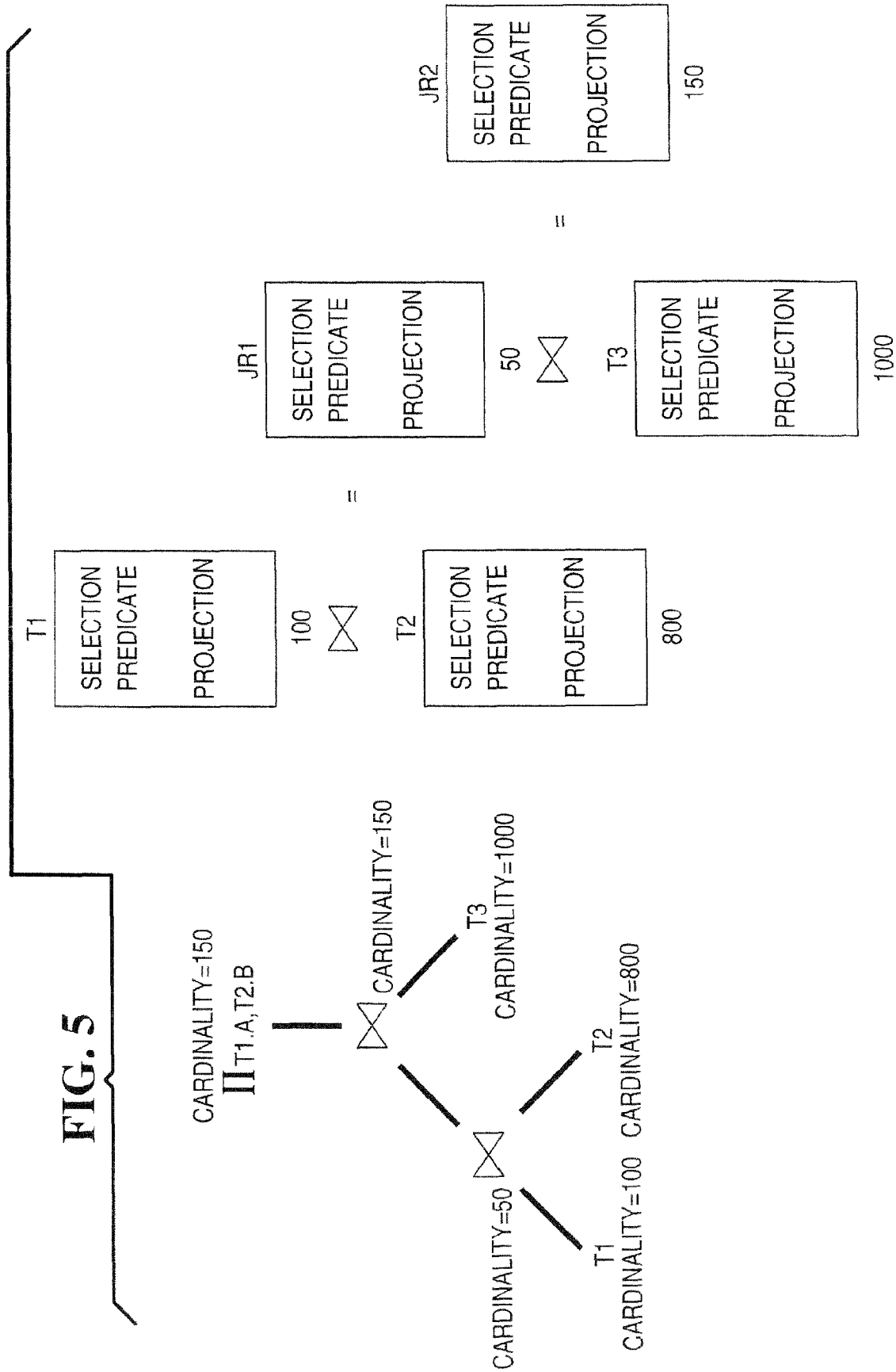
FIG. 5 illustrates two alternate representations of a query tree.

FIG. 5 depicts two alternate representations of a three-way (three-relation) join of tables T1, T2, and T3. The query tree on the left hand side indicates a join path in which table T1 is joined first with table T2, with the resultant join table joined with table T3 to produce the final result. Each table is associated with a cardinality, which refers to the number of database rows or tuples present in either a relation or a join relation. In the example, table T1 has a cardinality of 100 (that is, table T1 has 100 rows), table T2 has a cardinality of 800, and table T3 has a cardinality of 1,000. The join of tables T1 and T2 produces a join table with a cardinality of 50, and the join of the join table with table T3 produces another join table with a cardinality of 150.

The alternate representation on the right-hand side of FIG. 5 illustrates this join path. Table T1 and table T2 are joined to produce a join table JR1 (with cardinality 50). JR1 is joined with table T3 to produce join table JR2 (which has cardinality 150).

In some embodiments, the optimizer module 19 determines a best join order for a given set of relations by employing a concept of "lookahead" join planning. Given a four-way (four-relation) join, the optimizer module 19 determines the least costly pair of relations by not only performing the join of a given pair of relations under study, but also by performing N subsequent joins between the joined pair and the remaining relations in the set. N provides the lookahead level.

Figure 6:
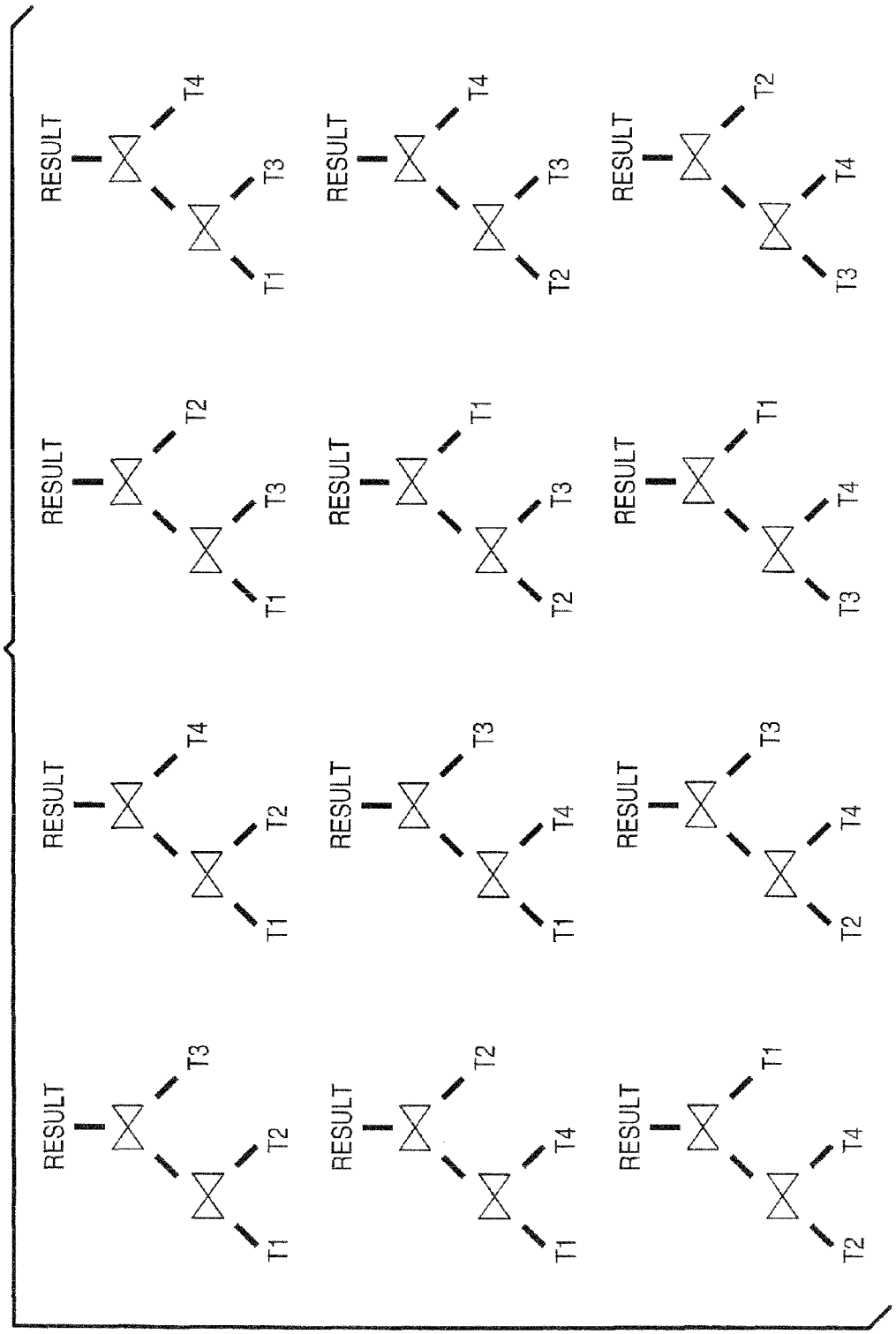
FIG. 6 illustrates possible combinations of tables considered by an optimizer module in the database system of FIG. 1 in one-lookahead join planning.

With one-lookahead planning, one additional join is performed after the principal join. This means that a total of three relations are joined into one. The cost of forming this triplet is then computed and compared against the cost of forming all other possible triplets. The lowest cost triplet is then chosen by the optimizer module 19, and the join for the principal pair of relations is committed. Thus, in an example involving tales T1, T2, T3, and T4, various possible triplet combinations are performed using one-lookahead join planning. A principal join may involve a join of tables T1 and T2. One-lookahead join planning will then consider a join of the join result of tables T1 and T2 with table T3 or T4. As shown in FIG. 6, various other triplets with other combinations as principal joins (T1, T3; T1, T4; T2, T3; T2, T4; and T3, T4) are considered.

Thus, one-lookahead join planning searches for the lowest cost presented by a series of three relations (out of all the relations specified by the join query). Similarly, two-lookahead join planning searches for the lowest cost associated with a series of four relations, three-lookahead join planning searches for the lowest cost associated with a series of five relations, and so forth. Generally, N-lookahead join planning searches for the lowest cost associated with a series of N+2 relations.

Figure 7:
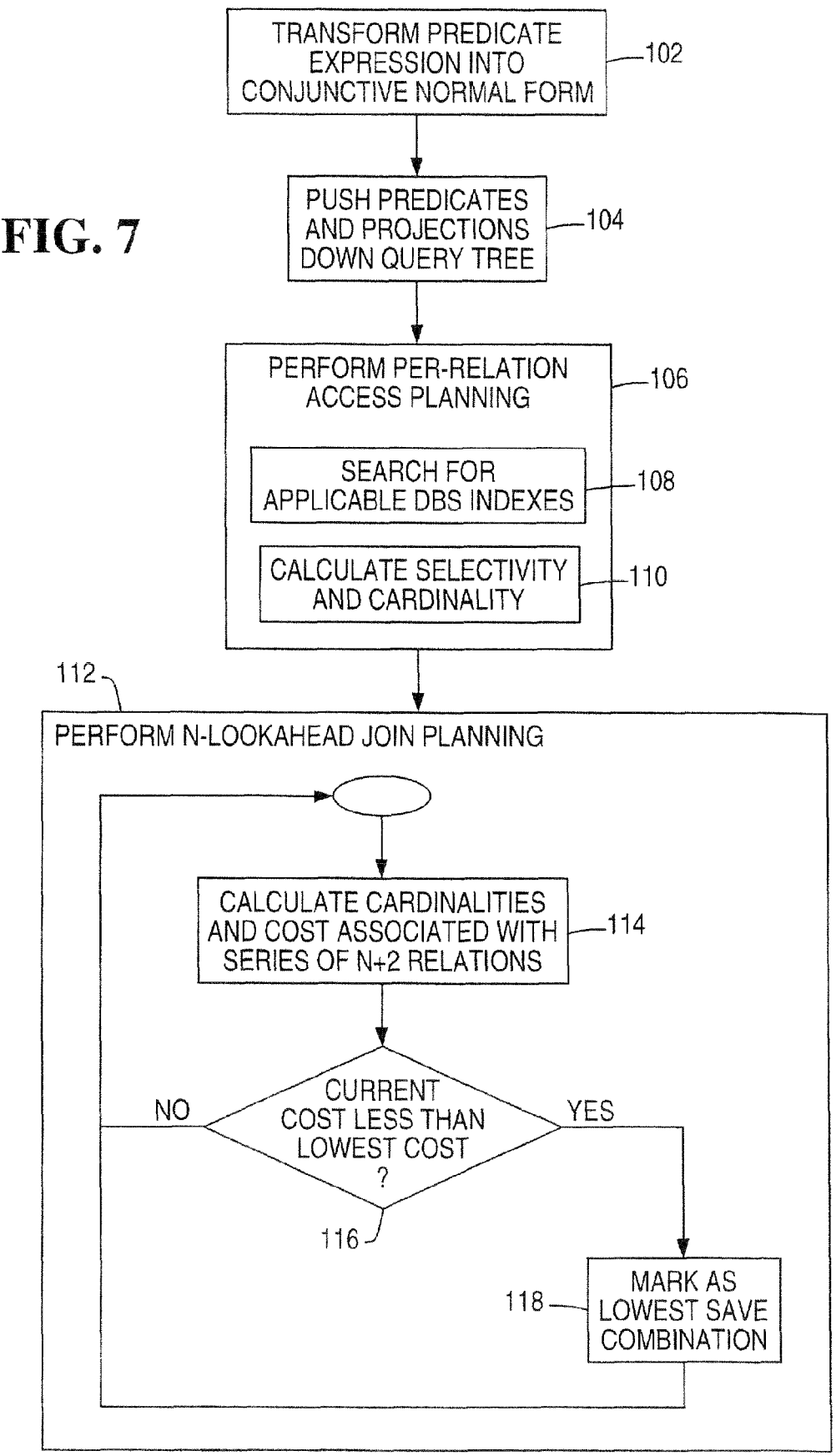
FIG. 7 is a flow diagram of a join planning process performed by the optimizer module for a join query that does not specify "costly" functions.

In accordance with some embodiments of the invention, the optimizer module 19 performs join planning differently depending upon whether or not a join query specifies a costly function. FIG. 7 shows a flow diagram of join planning by the optimizer module 19 in which costly functions are not involved. In response to receiving a join query with a select list and a Where clause, the optimizer module 19 transforms (at 102) predicate expressions into conjunctive normal form. For example, a predicate expression can be as follows: a*b or c. The conjunctive normal form of this expression is (a or c)*(b or c); in which (a or c) is one conjunct, while (b or c) is another conjunct.

The selection predicates and projections are pushed (at 104) down the query tree as much as possible by the optimizer module 19. If non-costly functions are involved in the selection predicates and projections, then applying selection predicates on each relation as it is accessed reduces the number of rows of the relation involved in a subsequent join. This reduces the number of input/output (I/O) operations, such as disk access, communications over the interconnect layer 15, and so forth.

Next, per-relation access planning is performed (at 106). In this step, the predicates of each relation are examined (at 108) for the applicability of database system indexes.

Next, calculations are performed (at 110) to estimate the selectivity and cardinality of each relation. The calculated cardinality represents the number of rows or tuples in the relation, while the calculated selectivity refers to the percentage of rows within a relation that meet the conditions of a selection predicate associated with the relation. For example, table Ti has a cardinality of 50, which means table Ti has 50 rows. If 40 of 50 rows meet a given selection predicate (e.g., T1.A=y), than the selectivity is 0.80

Next, the optimizer module 19 performs (at 112) N-lookahead join planning. The optimizer module 19 calculates (at 114) cardinalities and costs associated with a series of N+2 relations. For each combination of N+2 relations considered, the optimizer module 19 determines (at 116) if the cost of the combination considered currently is less than the lowest cost (of any of the previous by considered combinations). If so, the current combination is marked (at 118) as the lowest cost combination, and the combination is saved. This process is continued until all combinations of tables specified by a join query have been considered by the optimizer module 19. After going through this process, the optimizer module 19 has selected the join path with the lowest cost.

Figure 8:
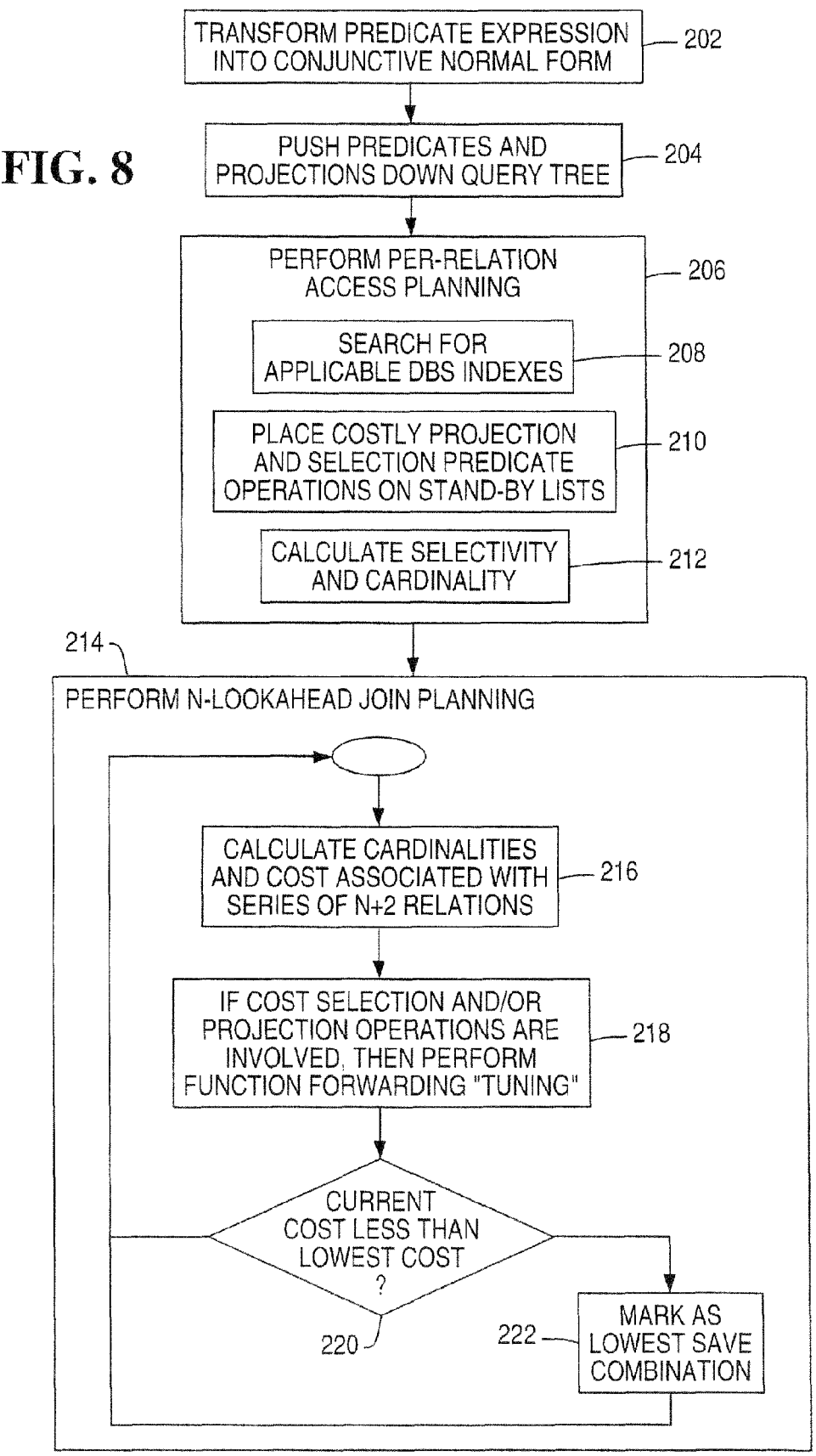
FIG. 8 is a flow diagram of a join planning process performed by the optimizer module for a join query that specifies costly functions.

FIG. 8 shows join planning performed by the optimizer module 19 in which a join query specifies a costly function, either in the form of a UDT method or application of selection predicates and/or projections on complex attributes. As in the join planning of FIG. 7, the optimizer module 19 transforms (at 202) a selection predicate expression into conjunctive normal form. The optimizer module 19 also pushes (at 204) selection predicates and projections down the associated query tree. Note that although the selection predicates and projections have been pushed down, that does not mean that they have been applied. Whether the selection predicates and projections are actually applied early depends on whether the selection predicates and projections costly functions. If they are costly functions, then the application of the selection predicate or projection is delayed, as further described below.

The optimizer module 19 next performs (at 206) per-relation access planning. In this planning, the optimizer module 19 examines (at 208) the predicates of each relation for the applicability of database system indexes. Next, the optimizer module 19 identifies and places (at 210) costly selection predicates and projections on respective standby lists. A StandbyC list is provided for costly selection predicates, while a StandbyA list is provided for costly projections (see FIG. 3). Moving costly selection predicates and projections to the standby lists effectively causes the optimizer module 19 to ignore such operations until a later point. Next, the optimizer module 19 calculates (at 212) the selectivity and the cardinality of each relation.

After performing the per-relation access planning (at 206), the optimizer module 19 performs N-lookahead join planning (at 214). The cardinalities and cost associated with a combination of a series of N+2 are calculated (at 216). Next, if a "costly" selection predicate and/or projection operation is involved, then the optimizer module 19 performs (at 218) "function forwarding tuning." The tuning basically determines whether the costly functions associated with the selection predicate and/or projection are to be applied on the base table or on a join table that is a result of the join of the base table and another table. A costly selection predicate and/or projection performed on a complex attribute takes a relatively large amount of time, when compared to the time needed for performing I/O operations. Thus, according to one embodiment, the costly selection predicate and/or projection are applied on the table with the lowest cardinality. In other words, the costly selection predicate and/or projection is applied on the table with the lowest number of rows, which reduces the number of costly operations. For example, consider a join of tables T1 and T2, with table T1 associated with a costly selection predicate. The join of tables T1 and T2 produces a join table JR1. The optimizer module 19 applies the costly selection predicate on the one of the tables T1 and JR1 that has the lowest cardinality.

The cost of the combination currently being considered is then compared (at 220) to a prior lowest cost combination. If the current cost is lower, then the currently considered combination is marked as the lowest cost and the combination is saved (at 222).

Join planning involving costly functions (UDT methods or selection predicates or projections applied on complex attributes) is described in the context of an example below. The following example query is considered:

```
SELECT   T1.A, T2.B, T3.VIDEO.COLORIZE( )
FROM     T1, T2, T3, T4
WHERE    T1.FACE = IMAGE(\\url\myface.jpg) AND
T2.D = "GEORGE" AND
T4.AUDIO = AUDIO(\\url\georgeharrison.wav) AND
T1.F = T2.F AND T2.G = T3.G AND
T1.H = T4.H AND T2.K = T4.K
```

The select list (or projection list) includes a costly function in the form of T3.VIDEO.COLORIZE( ). T3.VIDEO.COLORIZE( ) represents a UDT method associated with an attribute of table T3.

Figure 9:
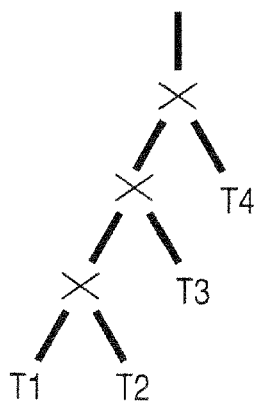
FIG. 9 illustrates a query tree of an example query that specifies costly functions.

In the Where clause of the join query, two costly functions are specified:
T1.FACE=IMAGE(\\url\myface.jpg); and
T4.AUDIO=AUDIO(\url\georgeharrison.wav). FIG. 9 shows a query tree representing the example join query.

Figure 10:
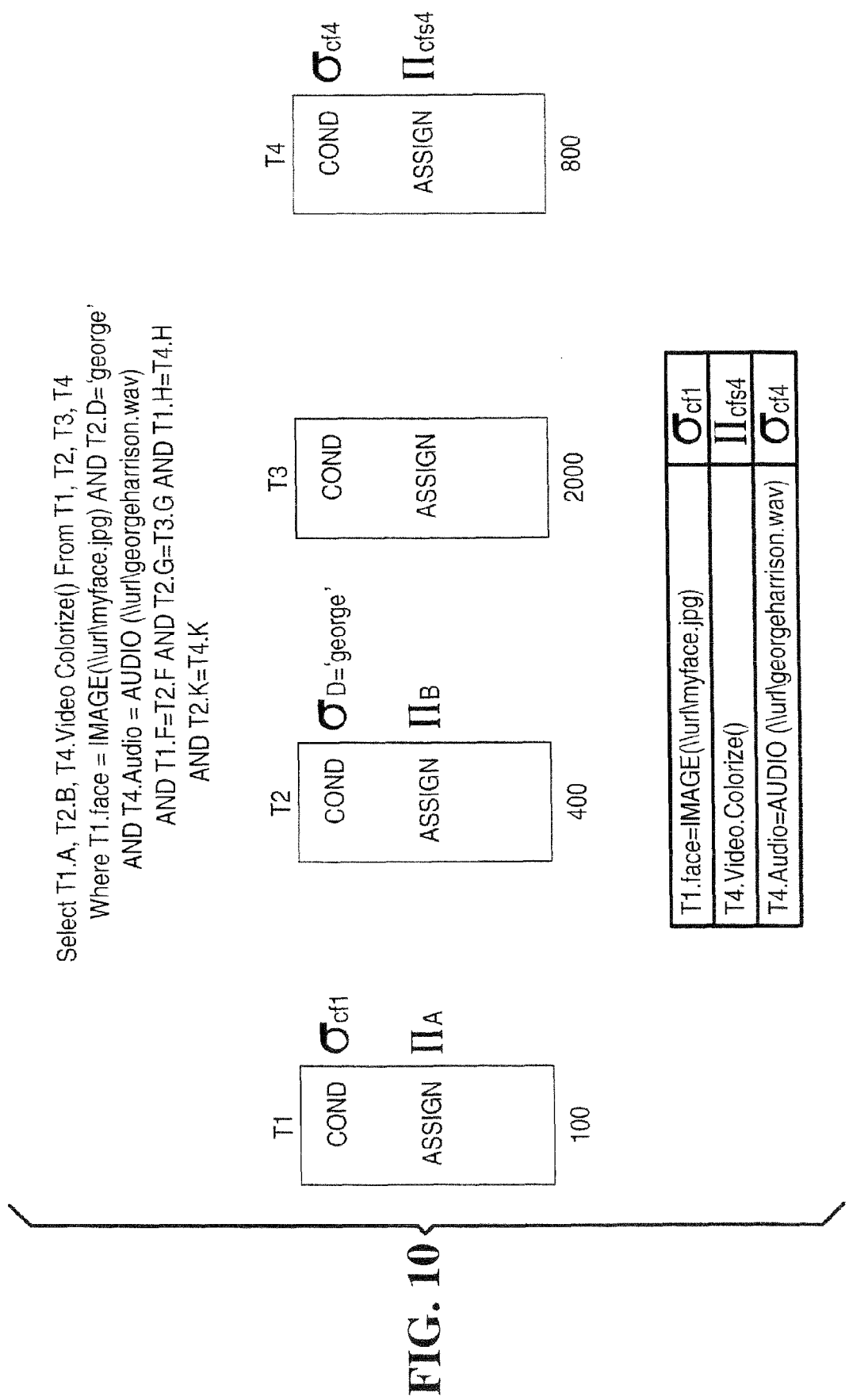
FIG. 10 illustrates functions on condition lists and projection lists of tables specified in the example query of FIG. 9.

As shown in FIG. 10, the costly selection predicate T1.FACE=IMAGE(\\url\myface.jpg) is represented as σcf1. The costly selection predicate T4.AUDIO=AUDIO (\\url\georgeharrison.wav) is represented as σcf4. The costly projection T4.VIDEO.COLORIZED( ) is represented as πcfs4. For the sake of clarity, in FIG. 10, only some of the selection predicates are shown.

Thus, for table T1, the costly selection predicate σcf1 is on the active condition (cond) list, and the projection πA is on the active assign list (or projection list). The cardinality of table T1 is 100. Table T2 is associated with an active condition (cond) list having σD="GEORGE", and an active assign list (or projection list) having projection πB. Table T4 has an active condition list containing costly function σcf4, and an active assign list containing costly function πcfs4. The cardinalities of tables T2, T3, and T4 are 400, 2000, and 800, respectively.

Figure 11:
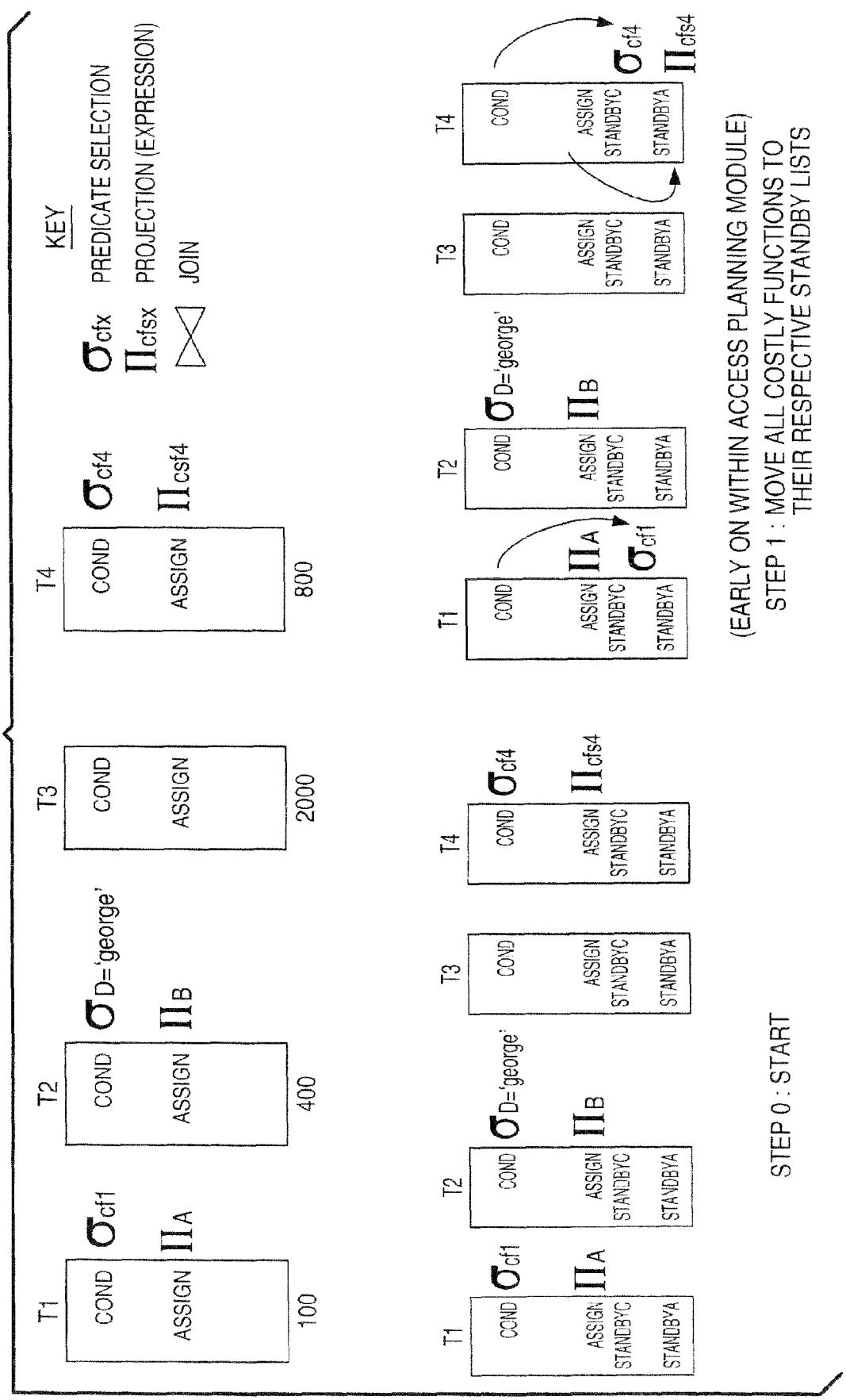
FIGS. 11-13 illustrate a join planning process performed by the optimizer module for the example query of FIG. 9.

As shown in FIG. 11, at the start of the join planning (referred to as step 0), each of the tables contains various selection predicates and projections specified in the condition list and projection list, respectively. Next, in step 1, which corresponds to step 210 in FIG. 8, the costly functions are moved to their respective standby lists. Thus, as shown in FIG. 11, the costly function σcf1 of table T1 is moved to the StandbyC list associated with table T1. Similarly, the costly function σcf4 is moved to the StandbyC list of table T4, and the costly function πcfs4 is moved to the StandbyA list of table T4.

However, an exception to moving a costly function to a standby list is where the costly predicate is found to be indexable. In this scenario, the index is used to access the relation and the pertinent expression remains on the active selection predicate list. Thus, for example, if σcf1 of table T1 is determined to also be used to build an index for table T1, then the result of the function is already stored elsewhere. Consequently, there is no need to move the complex function to a standby list, as the result of that complex function is already known.

Figure 12:
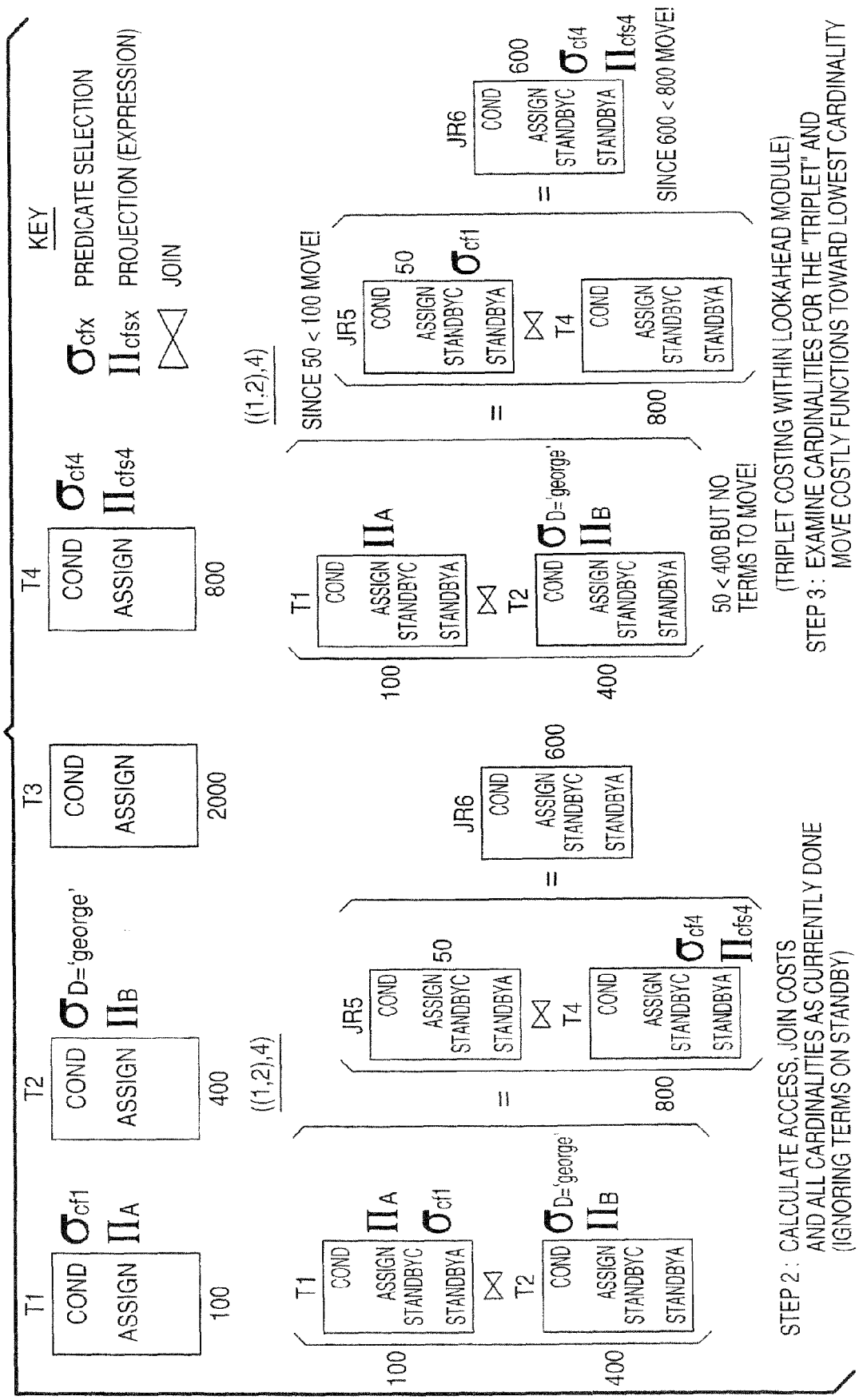

Next, as shown in FIG. 12, the cardinalities and join costs are calculated (ignoring terms on standby lists). This is illustrated as step 2 in FIG. 12, which corresponds to step 216 in FIG. 8. In the example shown in FIG. 12, the cardinality and cost associated with applying the non-complex selection predicate (σD="GEORGE") and projection (πB) of table T2 are first performed on table T2. Similarly, the non-complex projection (πA) is performed on table T1. After application of the non-complex selection predicates and projections, tables T1 and T2 are joined to produce join table JR5, which has a cardinality of 50. Table JR5 is then joined with table T4 to produce join table JR6.

The next operation performed by the optimizer module 19 is indicated as step 3 in FIG. 12. This step corresponds to the tuning step 218 in FIG. 8. The cardinalities of each of the tables (base tables and join tables) of the considered combination in step 2 are compared, with costly functions applied on a table with the lower cardinality. iN effect, the cost of applying a costly function on each table is determined, with the costly function applied on the table with lower cardinality (lower cost). In the example of FIG. 12, join table JR5 has a cardinality of 50, which is less than that of base table T1 (with a cardinality of 100). As a result, the costly selection predicate σcf1 is moved to the standby assign (StandbyA) list of table JR5. Similarly, a comparison of cardinalities of tables T4 and join table JR6 is performed. The cardinality of table JR6 is less than table T4, so the complex functions σcf4 and πcfs4 are moved to the standby lists of join table JR6.

Step 3 shown in FIG. 12 is the tuning operation referred to above, which involves moving complex functions to the point of lowest cardinality. This means deciding, for each relation, whether to execute the constraint (costly function) at the originating relation, or at some subsequent join relation having a lower cardinality.

Figure 13:
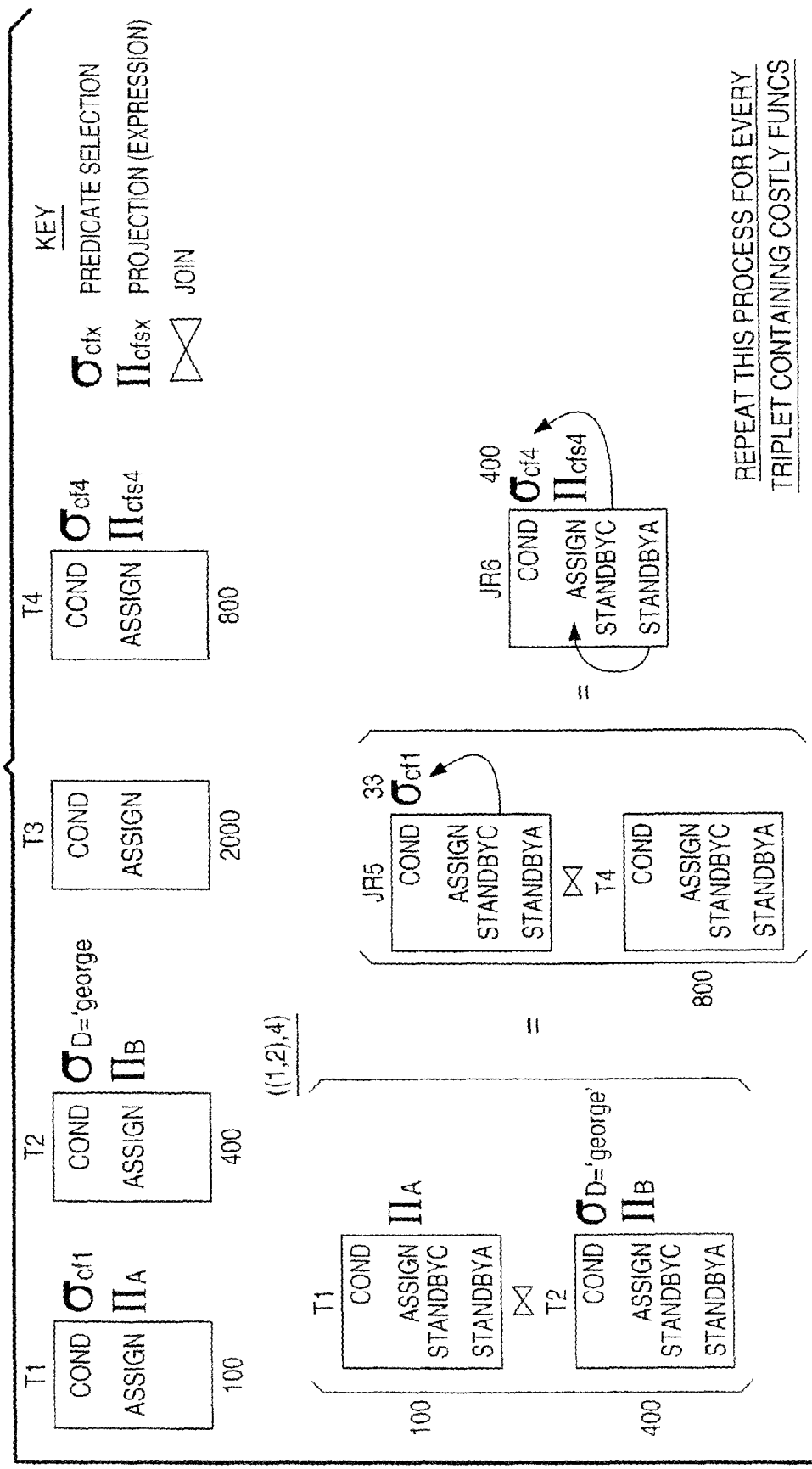

The optimization flow proceeds to step 4, which is shown in FIG. 13. In step 4, any terms present on the standby selection predicate list or projection list are moved to the active predicate list or projection list, respectively. Thus, as shown in FIG. 13, the complex function σcf1 is moved from the StandbyC list of join table JR5 to the active condition list, and the complex functions σcf4 and πcfs4 are moved to the active condition and assign lists, respectively, of table JR6. The selection predicate and projection operations are then performed on respective tables; that is, σcf1 is applied on table JR5, and σcf4 and πcfs4 are applied on table JR6. Adjustments are then made to the appropriate cardinality and costs calculations. A final "tuned" cost can then be calculated by the optimizer module 19. This tuned cost is compared against the current lowest cost (step 220 in FIG. 8).

The above example describes one-lookahead join planning involving costly functions in the selection predicate or projection list. However, a similar concept can be applied to N-lookahead projection planning with N being any value of 1 or greater.

Instructions of the various software routines or modules discussed herein (such as the optimizer module 19) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing a join in a database system comprising:
    receiving a join query containing at least one function selected from the group consisting of a selection predicate applied on a complex attribute, a projection applied on a complex attribute, and a user-defined data type method;
    determining, by at least one processor, a cost associated with applying the function on a first table and a cost associated with applying the function on a second table, wherein the join query specifies application of the function on the first table; and
    selecting, by the at least one processor, a join path based on relative costs of applying the function on the first and second tables,
    wherein selecting the join path comprises selecting the join path in which the function is applied on the second table rather than the first table based on a determination that the second table has a lower cardinality than the first table, the second table containing a join result of a join of the first table and another table.

2. The method of claim 1, wherein selecting the join path comprises selecting the join path in which the function is applied on the second table that is associated with a lower cost.

3. The method of claim 1, wherein determining the costs of applying the function on the first and second tables comprises determining the costs of applying the function on object relational tables.

4. The method of claim 1, wherein determining the costs comprises determining the respective cardinalities of the first and second tables.

5. The method of claim 1, wherein the function is not a join operation.

6. An article comprising at least one machine-readable storage medium containing instructions that when executed cause at least one processor of a database system to:
    receive a join query containing at least one function selected from the group consisting of a selection predicate applied on a complex attribute, a projection applied on a complex attribute, and a user-defined data type method, the join query specifying a join of a first table and a second table to produce a join table, wherein the join query specifies the function being applied on the first table; and
    determine a join path for the join query based at least in part on a cost associated with application of the function,
    wherein determining the join path comprises selecting the join path in which the function is applied on the join table rather than the first table based on a determination that the join table has a smaller cardinality than the first table.

7. The article of claim 6, wherein the instructions when executed cause the at least one processor to further determine the join path by further specifying a join of the join table and a third table to produce a fourth table.

8. The article of claim 7, wherein the join query further specifies application of a second function selected from the group consisting of a selection predicate applied on a complex attribute, a projection applied on a complex attribute, and a user-defined data type method, the second function being applied on the third table,
    wherein the instructions when executed cause the at least one processor to further determine the join path by further applying the second function on one of the third table and the fourth table with a lower cardinality.

9. The article of claim 6, wherein the instructions when executed cause the at least one processor to further:
    receive a second query specifying a join of the first table and another table, the second query specifying at least one of a selection predicate applied on a non-complex attribute and a projection applied on a non-complex attribute; and
    select another join path for the second query in which the selection or projection is applied on one of the first and second tables before performing a join of the first table with the second table.

10. The article of claim 6, wherein the function is not a join operation.

11. A database system comprising:
    a storage system to store tables;
    at least one processor;
    an optimizer executable on the at least one processor to receive a join query that specifies a function selected from the group consisting of a selection predicate applied on a complex attribute, a projection applied on a complex attribute, and a user-defined data type method, the optimizer to select a join plan based at least in part on a comparison of a first cost of applying the function on a first table and a second cost of applying the function on a second table, wherein the optimizer is to select the join plan that applies the function on the one of the first table and second table with a lower cardinality, wherein the second table contains a join result of the first table and another table, wherein the join query specifies the function being applied on the first table, and the optimizer to apply the function on the second table rather than the first table in response to determining the second cost is lower than the first cost.

12. The database system of claim 11, wherein the first and second tables are object relational tables.

13. The database system of claim 11, wherein the optimizer is executable to further:

receive a second query specifying a join of the first table and the another table, the second query specifying at least one of a selection predicate applied on a non-complex attribute and a projection applied on a non-complex attribute, select another join path for the second query in which selection or projection is applied on the first table before performing a join of the first table with the another table.

14. The database system of claim 11, wherein the optimizer is executable to further:

perform lookahead join planning in which costs for different combinations of joins are determined.

15. The database system of claim 11, wherein the function is not a join operation.

* * * * *